(12) United States Patent
Niino et al.

(10) Patent No.: US 6,221,946 B1
(45) Date of Patent: Apr. 24, 2001

(54) POLYOXYMETHYLENE RESIN COMPOSITION

(75) Inventors: Masahiko Niino, Kurashiki; Sadao Ibe, Tokyo, both of (JP)

(73) Assignee: Asahi Kasei Kogyo Kabushiki Kaisha, Osaka (JP)

( * ) Notice: Subject to any disclaimer, the term of this patent is extended or adjusted under 35 U.S.C. 154(b) by 0 days.

(21) Appl. No.: 09/171,679

(22) PCT Filed: Apr. 23, 1996

(86) PCT No.: PCT/JP96/01095

§ 371 Date: Oct. 23, 1998

§ 102(e) Date: Oct. 23, 1998

(87) PCT Pub. No.: WO97/40099

PCT Pub. Date: Oct. 30, 1997

(51) Int. Cl.[7] ........................................... C08L 59/00
(52) U.S. Cl. .................. 524/405; 524/404; 524/512; 525/154; 525/155
(58) Field of Search .................. 525/154, 155; 524/404, 405, 512

(56) References Cited

U.S. PATENT DOCUMENTS

| 3,860,568 | * | 1/1975 | Chabert . | |
| 4,041,022 | * | 8/1977 | Aboshi | 524/296 |
| 4,855,365 | * | 8/1989 | Yamamoto | 525/401 |
| 5,344,875 | | 9/1994 | Niino . | |
| 5,484,567 | * | 1/1996 | Nino | 264/328.1 |
| 5,785,177 | * | 7/1998 | Stridsberg | 206/446 |

FOREIGN PATENT DOCUMENTS

| 0148743 | | 7/1985 | (EP) . |
| 42-019498 | | 10/1967 | (JP) . |
| 49-040346 | | 4/1974 | (JP) . |
| 55-023304 | | 6/1980 | (JP) . |
| 57-015616 | | 3/1982 | (JP) . |
| 59-204652 | | 11/1984 | (JP) . |
| 2066365 | | 3/1990 | (JP) . |
| 4036341 | | 2/1992 | (JP) . |
| 4126758 | | 4/1992 | (JP) . |
| 4239566 | | 8/1992 | (JP) . |
| 5070678 | | 3/1993 | (JP) . |
| 6049320 | | 2/1994 | (JP) . |
| 06206235 | * | 7/1994 | (JP) . |
| 07257650 | * | 10/1995 | (JP) . |

* cited by examiner

Primary Examiner—Patricia A. Short
(74) Attorney, Agent, or Firm—Birch, Stewart, Kolasch & Birch, LLP

(57) ABSTRACT

A polyoxymethylene resin composition which comprises (A) 70–99.89% by weight of a polyoxymethylene resin, (B) 0.1–20% by weight of at least one ethylene-substituted vinyl copolymer having a melting point of 40–80° C. and prepared by polymerization using a radical polymerization catalyst, a chromium-containing catalyst or a Ziegler catalyst, and (C) 0.01–10% by weight of at least one liquid ethylene-α-olefin random copolymer. The resin composition of the present invention is small in friction coefficient and excellent in abrasion resistance under high load and high temperature against noncrystalline resins.

32 Claims, No Drawings

POLYOXYMETHYLENE RESIN COMPOSITION

This application is the national phase under 35 U.S.C. §371 of prior PCT International Application No. PCT/JP96/01095 which has an International filing date of Apr. 23, 1996 which designated the United States of America, the entire contents of which are hereby incorporated by reference.

TECHNICAL FIELD

The present invention relates to a novel polyoxymethylene resin composition having slidability at high temperatures. More particularly, it relates to a polyoxymethylene resin composition having slidability at high temperatures which is excellent especially in slidability with respect to noncrystalline resins under a high load and at a high temperature and is suitable as materials for sliding parts in the fields of precision apparatuses, office automation machines and automobiles.

Hitherto, polyoxymethylene resins have been widely used for office automation appliances as well as various mechanical parts as engineering plastics having well-balanced mechanical properties and excellent abrasion resistance.

However, the polyoxymethylene resins do not necessarily satisfy the requirements as sliding parts only by the abrasion resistance which they inherently possess, and especially under high load and high temperature, friction coefficient against noncrystalline resins increases, resulting in increase of abrasion wear.

The demand for polyoxymethylene resins to have a slidability with respect to noncrystalline resins has been brought about because the metals used in CD-ROM chassis, cartridge gearboxes of printers, facsimile chassis, floppy disk chassis, etc. are gradually substituted with noncrystalline resins and there occur problems in slidability between the noncrystalline resin parts and the polyoxymethylene resin parts (gear, cam, lever, etc.) which are used in contact with the noncrystalline resin parts.

If the sliding part between the polyoxymethylene resin and the noncrystalline resin is coated with greases as usually conducted when sliding is not smooth, the noncrystalline resin is deteriorated. Therefore, development of improved polyoxymethylene resin materials is desired without delay.

BACKGROUND ART

As methods for improving slidability of polyoxymethylene resins, the following are known, namely, a method of adding esters of 1,4-butanediol with fatty acids to polyoxymethylene resins (JP-B-55-23304), a method of adding borates of glycerin monofatty acid esters (JP-B-57-15616), a method of adding polyolefins having an active hydrogen, polyethylene and isocyanates (JP-A-4-126758 or U.S. Pat. No. 5,344,875), a method of adding copolymers of α-olefins and ethylene-vinyl monomers (JP-A-49-40346), a method of adding powders of ultra-high-molecular-weight polyethylene (EP-A-148743), etc. However, according to these methods, the slidability at room temperature has been improved to some extent, but the problems of increase of friction coefficient against noncrystalline resins and increase in abrasion wear under high load and at high temperature have not been solved at all.

Furthermore, JP-A-2-66365 discloses use of a composition obtained by adding a thermoplastic elastomer and a lubricant to a polyoxymethylene resin for low-noise gears. However, this reference makes no mention of the specific lubricant as used in the present invention and the method disclosed in this reference cannot give the slidability with respect to non-crystalline resins under high load and high temperature as aimed at by the present invention. JP-A-4-36341 discloses a method of adding a thermoplastic elastomer and an adduct of alcohol with alkylene oxide to a block copolymer containing a polyacetal, but this reference makes no mention of the specific lubricant as used in the present invention and the method disclosed in this reference cannot give the slidability with respect to noncrystalline resins under high load and high temperature as aimed at by the present invention.

On the other hand, there are known a method of blending polyoxymethylene with a polyolefin (JP-B-42-19498), a method of adding a liquid ethylene-α-olefin random copolymer (JP-A-4-239566), a method of adding a modified α-olefin polymer (JP-A-59-204652), and a method of adding a polyether copolymer having an average molecular weight of at least 500 (JP-A-5-70678). However, these known compositions have made substantially no improvement of the slidability with respect to noncrystalline resins under high load and high temperature as aimed at by the present invention.

The object of the present invention is to provide a polyoxymethylene resin composition having low friction coefficient and excellent abrasion resistance against non-crystalline resins under high load and high temperature (60–100° C.), particularly in point-contact reciprocation sliding test.

DISCLOSURE OF THE INVENTION

As a result of intensive research conducted by the inventors to attain the above object, it has been found that a polyoxymethylene resin composition comprising the following components can attain the above object:

(A) 70–99.89% by weight of a polyoxymethylene resin, (B) 0.1–20% by weight of at least one ethylene-substituted vinyl copolymer having a melting point of 40–80° C. and prepared by the polymerization using a radical polymerization catalyst, a chromium-containing catalyst or a Ziegler catalyst, and (C) 0.01–10% by weight of at least one liquid ethylene-α-olefin random copolymer.

Thus, the present invention has been accomplished.

The present invention will be explained in detail below.

BEST MODE FOR CARRYING OUT THE INVENTION

The polyoxymethylene resin used as the component (A) in the present invention includes, for example, homopolymers obtained by the polymerization of formaldehyde monomer or cyclic oligomers thereof such as trimer (trioxan) and tetramer (tetraoxan) and blocking both the terminals of the resulting polymer with ether or ester bonds, oxymethylene copolymers containing 0.1–20% by weight of an oxyalkylene unit having 2–8 carbon atoms which are obtained by the copolymerization of the above-mentioned trioxane or tetraoxan with a cyclic ether such as ethylene oxide, propylene oxide, 1,3-dioxolan, formal of glycol or formal of diglycol, the above oxymethylene copolymers further having branched molecular chain, and oxymethylene block copolymers containing 50% by weight or more of a segment comprising oxymethylene unit and less than 50% by weight of a different component segment.

As for the flowability of the polyoxymethylene resins used, they have a melt index (MI; measured under the conditions of ASTM D1238-57 E) of preferably 10–50 g/10 min, more preferably 20–40 g/10 min.

Preferred polyoxymethylene resins are polyoxymethylene homopolymers, both the terminals of which are blocked with acetyl groups, from the point of slidability at high temperatures.

More preferred polyoxymethylene resins are polyoxymethylene block copolymers, one terminal of which is blocked with a residue of an adduct of alcohol with alkylene oxide from the viewpoint of low friction coefficient at high temperatures.

Especially preferred polyoxymethylene resins are blends of a polyoxymethylene homopolymer, both the terminals of which are blocked with acetyl groups and a polyoxymethylene block copolymer, one terminal of which is blocked with a residue of an adduct of alcohol with alkylene oxide from the viewpoint of low friction coefficient at high temperatures.

The polyoxymethylene block copolymer, one terminal of which is blocked with a residue of an adduct of alcohol with alkylene oxide can be produced by the process disclosed in JP-B-2-24307.

Preferred alcohols which constitute the residue of adduct of alcohol with alkylene oxide are aliphatic alcohols of 12–22 carbon atoms and preferred alkylene oxides are propylene oxide and tetramethylene oxide. The mol number of the alkylene oxide added to the alcohol in the adduct is 1–1,000, preferably 1–50.

The preferred number-average molecular weight of the portion of the block copolymer excluding the terminal group is 10,000–500,000.

The preferred blending ratio of the polyoxymethylene homopolymer, both the terminals of which are blocked with acetyl groups and the polyoxymethylene block copolymer, one terminal of which is blocked with a residue of an adduct of alcohol with alkylene oxide is 5–90% by weight, preferably 50–80% by weight of the block copolymer in 100 parts by weight of the total polyoxymethylene resin.

The content of the polyoxymethylene resin which is the component (A) in the composition of the present invention is 70–99.89% by weight of the total composition. If the content is less than 70% by weight or more than 99.89% by weight, the sliding characteristics at high temperatures deteriorate.

The component (B) in the composition of the present invention is at least one ethylene-substituted vinyl copolymer having a melting point of 40–80° C. and prepared by the polymerization using a radical polymerization catalyst, a chromium-containing catalyst or a Ziegler catalyst. If the melting point is lower than 40° C. or higher than 80° C., the sliding characteristics at high temperatures deteriorate.

More preferred melting point of the ethylene-substituted vinyl copolymer is 60–75° C., because the friction coefficient at high temperatures is low.

In the present invention, the ethylene-substituted vinyl copolymer does not include graft-modified copolymers, because the graft-modified copolymers are inferior in slidability under high load and high temperature.

The component (B) is at least one ethylene-substituted vinyl copolymer having a melting point of 40–80° C. and prepared by the polymerization using a radical polymerization catalyst, a chromium-containing catalyst or a Ziegler catalyst, but is never used in combination with polyolefins prepared by the polymerization using single-site catalysts which are uniform in properties of active points, such as metallocene catalysts containing 1–3 molecules of cyclopentadienyl or substituted cyclopentadienyl which are described in EP-A-69951, EP-A-128046, EP-A-129368, EP-A-128045, EP-A-294942, EP-A-516458, EP-A-416815 and U.S. Pat. No. 5,272,236. If these polyolefins are used in combination, the slidability with resepct to noncrystalline resins at high temperatures is considerably deteriorated.

The melting point in the present invention is an endothermic peak value when a sample is first heated from room temperature to 200° C. at a rate of 10° C./min as a pretreatment and, thereafter, cooled to −30° C. at a rate of 10° C./min, and, then, again heated at a rate of 10° C./min for the measurement using a differential scanning calorimeter (DSC-7 manufactured by Perkin-Elmer Co., Ltd.).

The substituted vinyl which constitutes the ethylene-substituted vinyl copolymer is one obtained by substituting one or more hydrogen of ethylene with other substituents. As examples thereof, mention may be made of α-olefins of 3–20 carbon atoms, isobutene, styrene, methyl methacrylate, methyl acrylate, acrylonitrile, vinyl acetate, 2-hydroxyethyl methacrylate, acrylic acid, acrylamide, allylamine, allyl alcohol, glycidyl methacrylate, etc.

Substituted vinyl having no active hydrogen is preferred. More preferred are α-olefins of 3–8 carbon atoms. As examples thererof, mention may be made of propylene, 1-butene, 1-pentene, 4-methyl-1-pentene, 1-hexene, 1-heptene, 1-octene, etc. More preferred carbon number of the α-olefins is 3 or 4 and further preferred is 4, because the lower friction coefficient can be obtained.

The melt index (measured under the conditions of ASTM D1238-57 E) of the ethylene-substituted vinyl copolymers in the present invention is preferably 0.1–40 g/10 min, more preferably 0.5–10 g/10 min because a low friction coefficient can be obtained.

Ethylene-α-olefin copolymers prepared by the polymerization using a chromium-containing catalyst or a Ziegler catalyst are preferably used. Ethylene-α-olefin copolymers prepared by the polymerization using a Ziegler catalyst are more preferred because a low friction coefficient is obtained.

The polymerization catalysts used for preparing the ethylene-substituted vinyl copolymers are radical polymerization catalysts, chromium-containing catalysts or Ziegler catalysts.

The radical polymerization catalysts are compounds which can decompose monomer molecules at relatively low temperatures and generate its radicals.

Specifically, the following peroxides and azo compounds may be mentioned. For example, there are benzoyl peroxide, azobisisobutyronitrile, cumene hydroperoxide, tert-butyl hydroperoxide, persulfates such as potassium persulfate and ammonium persulfate, etc.

Moreover, redox catalysts obtained by adding a reducing agent to the above radical polymerization catalyst to increase the radical generating rate can also be used.

The ethylene-α-olefin copolymers obtained using the above catalysts are prepared by the high-pressure radical polymerization method which is generally employed. For example, they can be produced by polymerizing monomers in a tank-type or tubular reaction vessel with simultaneous or stepwise contact with the catalyst using a chain transfer agent and, if necessary, an assistant, in the presence of a radical polymerization initiator in an amount of 0.001–1% by weight of the total monomers under the conditions of a polymerization pressure of 500–4,000 kg/cm$^2$, preferably 1,000–3,500 kg/cm$^2$ and a reaction temperature of 50–400° C., preferably 100–350° C.

The chromium-containing catalysts are those represented by Phillips catalysts which comprise a chromium compound as an essential component and additionally contain silica, alumina or the like. As examples of these catalysts, mention may be made of silyl chromate catalysts described in U.S. Pat. No. 3,324,101 and U.S. Pat. No. 3,324,095, bis (cyclopentadienyl) chromium (II) compounds described in U.S. Pat. No. 3,879,368, catalysts comprising oxides of chromium and titanium and a carrier described in U.S. Pat. No. 4,011,382, polychromium compounds described in EP-A-174507, etc. Preferred are catalysts containing chromium trioxide and silicon dioxide from the point of slidability at high temperatures.

The ethylene-α-olefin copolymers using the above catalysts are produced by the general medium-pressure polymerization processes disclosed in JP-A-58-49706, EP-A-100879 and EP-A-174507.

The Ziegler catalysts are those which comprise an organometallic compound containing a metal in groups I, II and III (excluding boron) of the periodic table as one component and a compound containing a transition metal in groups IV–VIII as another component. Representative are catalysts comprising a trialkylaluminum and titanium (IV) chloride. The transition metal compounds used include, for example, titanium trichloride, titanium tetrachloride, vanadium oxychloride, chromium oxide, nickel compounds, molybdenum compounds, etc. The organometallic compounds include, for example, alkylaluminum compounds such as triethylaluminum, triisobutylaluminum, diethylaluminum chloride, ethylaluminum sesquichloride, etc. The ethylene-α-olefin copolymers obtained using these catalysts are produced by the general low-pressure polymerization processes disclosed in GB 1211287, JP-B-45–40295 and JP-B-46-33568.

Preferred Ziegler catalysts are those which contain titanium and/or vanadium compounds and an organoaluminum compound as constituting components of the catalysts in view of the slidability at high temperatures. The ethylene-α-olefin copolymers are produced preferably using hydrogen or the like as a molecular weight modifier at a reaction temperature of −50–100° C. and a reaction pressure of 0–50 kg/cm$^2$. More preferably, ethylene and 1-butene are copolymerized in an inert solvent capable of carrying out a slurry polymerization in the presence of a catalyst comprising a reaction product of a vanadyl halide (halogenated vanadium oxide) with cyclohexane and an organoaluminum halide.

Preferred catalysts for obtaining the ethylene-substituted vinyl copolymers in the present invention are chromium-containing catalysts and Ziegler catalysts, and more preferred are Ziegler catalysts.

The ethylene-substituted vinyl copolymer can be added in an amount of 0.1–20% by weight based on the total resin composition of the present invention. The amount of the copolymer is preferably 1–10% by weight, more preferably 1–3% by weight because the further lower friction coefficient can be developed. If the amount is less than 0.1% by weight, the slidability at high temperatures cannot be improved and if it exceeds 20% by weight, the friction coefficient at high temperatures increases.

The term "liquid" in the liquid ethylene-α-olefin random copolymer used as the component (C) in the present invention means a liquid or highly viscous liquid having flowability at 23° C. Preferred liquid ethylene-α-olefin random copolymers are those which have a number-average molecular weight of 500–10,000 measured from vapor pressure osmometry, an ethylene unit content of 20–80 mol % and 3–20 carbon atoms in the α-olefin unit.

Preferred are random copolymers of ethylene with at least one aliphatic substituted vinyl monomer such as propylene, 1-butene, 1-pentene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene or 1-eicosene.

The ethylene content is more preferably 30–70 mols because a low friction coefficient can be developed.

The number-average molecular weight is more preferably 600–8,000, further preferably 700–5,000 because a low friction coefficient can be developed.

The number of carbon atoms in α-olefin is more preferably 3–10, further preferably 3, because a low friction coefficient can be developed.

The liquid ethylene-α-olefin random copolymer can be produced in the presence of a Ziegler catalyst described in EP-A-60609 using hydrogen as a molecular weight modifier.

The liquid ethylene-α-olefin random copolymer can be used alone or in combination of two or more which differ in composition and molecular weight.

The content of the liquid ethylene-α-olefin random copolymer is 0.01–10% by weight based on the total resin composition of the present invention. If the content is less than 0.01% by weight or exceeds 10% by weight, the slidability at high temperatures is damaged. The content is preferably 1.0–6% by weight from the viewpoint of obtaining the further lower friction coefficient.

The resin composition of the present invention can further contain a β-alanine copolymer in an amount of 0.01–5% by weight for 100 parts by weight of the composition comprising the components (A), (B) and (C). The β-alanine copolymer is a copolymer having 3-nylon structure and other structures in the main chain.

Specific examples of the β-alanine copolymer are those which are obtained by copolymerizing acrylamides or derivatives thereof or the acrylamides or derivatives thereof with other vinyl monomers in the presence of a metal alcoholate, which contain a primary amide in an amount of 1.4–13 mmols per 1 g of the polyacrylamide copolymer (JP-A-63-118328 or U.S. Pat. No. 4,855,365 and JP-A-3-234729).

The average particle diameter of the β-alanine copolymer is preferably 1–10 μm, more preferably 1–6 μm. The amount of the β-alanine copolymer based on 100 parts by weight of the composition comprising the components (A), (B) and (C) is 0.1–0.5 part by weight.

The resin composition of the present invention can further contain boron nitride having an average particle diameter of 0.5–10 μm and having a diboron trioxide content of 0.01–1.0% by weight based on the total boron nitride, the amount of said boron nitride being 5–500 ppm based on 100 parts by weight of the composition comprising the above components (A), (B) and (C). In this case, a low friction coefficient can be obtained even at high temperatures. The average particle diameter of boron nitride is more preferably 0.6–4.0 μm. The diboron trioxide content is more preferably 0.05–0.2% by weight. The amount of boron nitride is more preferably 50–300 ppm based on 100 parts by weight of the composition.

The resin composition of the present invention can be pelletized by melt kneading at a temperature higher than the melting point of the polyoxymethylene resin by commonly employed melt kneading machines. The melt kneading machines include, for example, a kneader, a roll mill, a single-screw extruder, a twin-screw extruder and a multi-screw extruder, but, considering the interception of oxygen and the working atmosphere, it is preferred to pelletize the composition by a twin-screw (double flighted screw) extruder subjected to reduction in pressure by venting.

Unless the attainment of the object of the present invention is obstructed, the resin composition of the present invention can optionally contain ordinary additives for plastics, such as hindered phenol, hindered amine, ultraviolet absorber, inorganic filler, pigment, etc. and can also contain additive components commonly used for polyoxymethylene resins, such as melamine, melamine formaldehyde condensate, etc.

The present invention is explained in more detail by the following examples and comparative examples, which are given without any intention that the invention be limited thereto.

EXAMPLES 1–16

The Present Invention

A powder of a polyoxymethylene homopolymer whose both the terminals were acetylated and which had an intrinsic viscosity of 1.2 (measured at 60° C. on a solution prepared by dissolving 0.1% by weight of the polymer in p-chlorophenol containing 2% by weight of α-pinene) and a melt index of 9.0 g/10 min (ASTM D1238-57(E)) was prepared in accordance with the process described in U.S. Pat. No. 2,998,409, and the resulting powder was dried at 80° C. for 3 hours. To this polymer was added Irganox 245 (trademark) manufactured by Ciba-Geigy Corp. as an antioxidant in an amount of 0.3 part based on 100 parts by weight of polyoxymethylene to obtain a polyacetal homopolymer. Polyolefins shown in Tables 2 and 3 were prepared by copolymerizing ethylene and α-olefins in the presence of a catalyst comprising a reaction product of a vanadyl halide with cyclohexane and an organoaluminum halide described in JP-A-50-155583 in an inert solvent which makes it possible to perform a slurry polymerization. The above polyacetal homopolymer and polyolefin and the lubricant shown in Table 1 were blended as shown in Tables 2 and 3 in a nitrogen atmosphere. The resulting blend was melt kneaded using a twin-screw vent extruder of L/D 25 set at 200° C. under the conditions of a screw revolution speed of 100 rpm, a discharging amount of 3 kg/hr, a maximum resin temperature of 205–210° C. and a kneading time (residence time) of 0.5–0.7 minute, thereby to prepare resin compositions having the composition as shown in Tables 2 and 3, which were further pelletized.

The resulting pellets were dried at 80° C. for 3 hours and molded into a flat plate of 3 mm thick by a 1 ounce molding machine (TI30G manufactured by Toyo Kikai Kinzoku Co., Ltd.) set at a cylinder temperature of 200° C. under the conditions of a mold temperature of 70° C. and a cooling time of 20 seconds, obtaining a test piece.

The test piece was evaluated on point-contact reciprocation slidability by measuring the friction coefficient and the abrasion wear (maximum depth of wear) after a noncrystalline resin (as a mating material used in the test) which was a blend of 30% by weight of polyphenylene oxide ($\eta_{sp/c}$=0.5 dl/g in chloroform at 25° C.), 20% by weight of HIPS, 10% by weight of polystyrene GP and 40% by weight of glass flakes (average particle size 10µ) and which was molded into a piece of 5φ and tip R=2.5 at a molding temperature of 280° C. was reciprocated 30,000 times on the test piece using a reciprocating dynamic friction abrasion tester (AFT-15MS type manufactured by Tosoku Seimitsu Co., Ltd.) under a load of 4 kg, at a linear velocity of 10 mm/sec and with a reciprocating distance of 20 mm and with changing the environmental temperature to 60, 80 and 100° C.

The results are shown in Tables 2–4.

EXAMPLES 17–26

Comparative Examples

The tests were conducted in the same manner as in Example 1, except that polyolefins obtained in the same manner as in Example 1 using the monomer compositions of Table 5 were used as the polyolefins in Examples 17–18, the same polyolefin as of Example 1 was used in Examples 19–21, EDPE (melting point: 130° C.) prepared using a Ziegler catalyst comprising anhydrous magnesium chloride, titanium tetrachloride and triethylaluminum described in EP-A-148743 was used as the polyolefin in Example 22, LDPE (melting point: 110° C.) prepared by high-pressure radical polymerization process using benzoyl peroxide as the catalyst was used in Example 23, and polyethylene-1-octene obtained by the polymerization with (tert-butylamide)dimethyl(tetramethyl-η5-cyclopentadienyl) silane titanium dichloride (single site catalyst) described in EP-A-416815 was used in Example 24, and other components were as shown in Tables 5–6.

In Examples 25 and 26, the test was conducted in the same manner as in Example 1, except that the lubricants G and H shown in Table 1 were used.

The results are shown in Tables 5 and 6.

EXAMPLE 27

The Present Invention

The test was conducted using the same compositions and method as in Example 1, except that a polyoxymethylene copolymer having an intrinsic viscosity of 1.1 and a melt index of 10 g/10 min and containing 2.8% by weight of oxyethylene group was prepared in accordance with the process described in U.S. Pat. No. 3,027,352 and this copolymer was used as the polyoxymethylene resin and the polyolefin shown in Example 1 was used.

As a result, the friction coefficients at 60, 80 and 100° C. were 0.16, 0.15 and 0.13, respectively, and the abrasion wears were 60, 55 and 50 µm, respectively.

EXAMPLE 28

The Present Invention

The test was conducted in the same manner as in Example 1, except that ethylene-1-butene copolymer (mp 71° C., melt index: 3.6 g/10 min) prepared by the polymerization using a catalyst described in JP-A-58-49706 which carried a reaction product of chromium trioxide and a compound giving a silanol and which was prepared by treating silica as a carrier with a reaction product of chromium trioxide and titanium tetraalcoholate and then sintering the treated product was used as the ethylene-α-olefin copolymer in Example 1.

As a result, the friction coefficients at 60, 80 and 100° C. were 0.18, 0.16 and 0.14, respectively, and the abrasion wears were 60, 55 and 55 µm, respectively.

EXAMPLE 29

The Present Invention

The test was conducted in the same manner as in Example 1, except that ethylene-vinyl acetate (30 mol %) copolymer (mp: 70° C., melt index; 10 g/10 min) obtained by the high-pressure radical polymerization method (pressure: 1000 kg/cm$^2$, reaction temperature: 200° C.) using benzoyl peroxide in an amount of 0.1% by weight based on the total monomers as a catalyst was used as the ethylene-1-butene copolymer.

As a result, the friction coefficients at 60, 80 and 100° C. were 0.20, 0.21 and 0.20, respectively, and the abrasion wears were 80, 80 and 80 μm, respectively.

EXAMPLE 30

The Present Invention

The test was conducted in the same manner as in Example 1, except that a blend of 40 parts by weight of polyoxymethylene block copolymer (melt index: 9 g/10 min) whose one terminal was blocked with a residue of adduct of stearyl alcohol with 10 mols of propylene oxide and another terminal was blocked with acetyl group which was prepared by the process described in JP-B-2-24307 and 60 parts by weight of polyoxymethylene homopolymer (melt index: 9 g/10 min) whose both the terminals were acetylated was used in place of the polyoxymethylene homopolymer whose both the terminals were acetylated.

As a result, the friction coefficients at 60, 80 and 100° C. were 0.12, 0.12 and 0.10, respectively, and the abrasion wears were 40, 35 and 35 μm, respectively.

EXAMPLE 31

The Present Invention

Acrylamide and methylenebisacrylamide (10 mol %) were polymerized in the presence of a metal alcoholate in accordance with the process described in JP-A-63-118328 or U.S. Pat. No. 4,855,365 and JP-A-3-234729 to prepare a β-alanine copolymer having a primary amide content of 10 mmols/g of polymer and having an average article diameter of 4 μm. 0.3 part by weight of the resulting polymer was added to 100 parts by weight of the composition of Example 1. The composition was tested in the same manner as in Example 1.

As a result, the friction coefficients at 60, 80 and 100° C. were 0.13, 0.13 and 0.09, respectively, and the abrasion wears were 50, 50 and 50 μm, respectively.

EXAMPLE 32

The Present Invention

To 100 parts by weight of the composition of Example 29 was added 200 ppm of boron nitride having an average particle diameter of 1 μm and a diboron trioxide content of 0.1% by weight, and the composition was tested in the same manner as in Example 1.

As a result, the friction coefficients at 60, 80 and 100° C. were 0.12, 0.12 and 0.09, respectively, and the abrasion wears were 48, 45 and 40 μm, respectively.

TABLE 1

| | Kind of lubricants | |
|---|---|---|
| A | Liquid ethylene (50 mol %) – propylene (50 mol %) random copolymer | Mn = 2600 |
| B | " | Mn = 500 |
| C | " | Mn = 10,000 |
| D | " | Mn = 700 |
| E | " | Mn = 5,000 |
| F | Liquid ethylene (40 mol%) = propylene (10 mol %) – octene (50 mol %) random copolymer | Mn = 2600 |
| G | Tetramethylene glycol (50 mol %) – ethylene glycol copolyme | Mn = 2600 |
| H | Stearyl stearate | |

TABLE 2

| | Composition — Example | | | | | | | Evaluation | | |
|---|---|---|---|---|---|---|---|---|---|---|
| | Polyoxymethylene | Polyolefin | | | | | | Measure- | | |
| Example | homopolymer (wt %) | Amount (wt %) | Ethylene unit (mol %) | Other monomer (mol %) | Melting point (° C.) | MI | Lubricant* (wt %) | ing temperature (° C.) | Friction coefficient | Abrasion wear (μ) |
| 1 | 94 | 3 | 85 | 1-butene (15) | 67 | 3.6 | A (3.0) | 60 80 100 | 0.13 0.13 0.13 | 55 50 50 |
| 2 | 94 | 3 | 84 | 1-butene (16) | 50 | 3.6 | A (3.0) | 60 80 100 | 0.16 0.15 0.16 | 60 50 50 |
| 3 | 94 | 3 | 85.5 | 1-butene (14.5) | 75 | 3.6 | A (3.0) | 60 80 100 | 0.13 0.13 0.13 | 55 50 50 |
| 4 | 94 | 3 | 83 | 1-butene (17) | 40 | 3.6 | A (3.0) | 60 80 100 | 0.17 0.17 0.17 | 60 59 59 |

TABLE 2-continued

| | Composition | | | | | | | Evaluation | | |
|---|---|---|---|---|---|---|---|---|---|---|
| | Polyoxy-methlene homo-polymer (wt %) | Polyolefin | | | | | Lubricant* (wt %) | Measure-ing tem-perature (° C.) | Friction coef-ficient | Abrasion wear (μ) |
| Example | | Amount (wt %) | Ethylene unit (mol %) | Other monomer (mol %) | Melting point (° C.) | MI | | | | |
| 5 | 94 | 3 | 86.5 | 1-butene (13.5) | 80 | 3.6 | A (3.0) | 60 | 0.16 | 60 |
| | | | | | | | | 80 | 0.17 | 59 |
| | | | | | | | | 100 | 0.17 | 59 |
| 6 | 94 | 3 | 85 | 1-butene (15) | 67 | 3.6 | A (1.5) B (1.5) | 60 | 0.13 | 50 |
| | | | | | | | | 80 | 0.12 | 50 |
| | | | | | | | | 100 | 0.12 | 50 |
| 7 | 96.9 | 0.1 | 85 | 1-butene (15) | 67 | 3.6 | A (3.0) | 60 | 0.18 | 70 |
| | | | | | | | | 80 | 0.18 | 63 |
| | | | | | | | | 100 | 0.18 | 63 |

*see Table 1

TABLE 3

| | Composition | | | | | | | Evaluation | | |
|---|---|---|---|---|---|---|---|---|---|---|
| | Polyoxy-methlene homo-polymer (wt %) | Polyolefin | | | | | Lubricant* (wt %) | Measure-ing tem-perature (° C.) | Friction coef-ficient | Abrasion wear (μ) |
| Example | | Amount (wt %) | Ethylene unit (mol %) | Other monomer (mol %) | Melting point (° C.) | MI | | | | |
| 8 | 95.0 | 2 | 85 | 1-butene (15) | 67 | 3.6 | A (3.0) | 60 | 0.13 | 55 |
| | | | | | | | | 80 | 0.13 | 50 |
| | | | | | | | | 100 | 0.13 | 50 |
| 9 | 77.0 | 20 | 85 | 1-butene (15) | 67 | 3.6 | A (3.0) | 60 | 0.18 | 65 |
| | | | | | | | | 80 | 0.17 | 63 |
| | | | | | | | | 100 | 0.17 | 63 |
| 10 | 94 | 3 | 85 | 1-butene (15) | 67 | 3.6 | B (3.0) | 60 | 0.16 | 60 |
| | | | | | | | | 80 | 0.15 | 60 |
| | | | | | | | | 100 | 0.15 | 60 |
| 11 | 94 | 3 | 85 | 1-butene (15) | 67 | 3.6 | C (3.0) | 60 | 0.16 | 60 |
| | | | | | | | | 80 | 0.15 | 60 |
| | | | | | | | | 100 | 0.15 | 60 |
| 12 | 94 | 3 | 85 | 1-butene (15) | 67 | 3.6 | D (3.0) | 60 | 0.14 | 55 |
| | | | | | | | | 80 | 0.14 | 50 |
| | | | | | | | | 100 | 0.13 | 50 |
| 13 | 94 | 3 | 85 | 1-butene (15) | 67 | 3.6 | E (3.0) | 60 | 0.14 | 55 |
| | | | | | | | | 80 | 0.14 | 50 |
| | | | | | | | | 100 | 0.13 | 50 |
| 14 | 94 | 3 | 85 | 1-butene (15) | 67 | 3.6 | F (3.0) | 60 | 0.15 | 60 |
| | | | | | | | | 80 | 0.15 | 55 |
| | | | | | | | | 100 | 0.14 | 60 | see Table 1

TABLE 4

| | Composition | | | | | | | Evaluation | | |
|---|---|---|---|---|---|---|---|---|---|---|
| | Polyoxy-methlene | Polyolefin | | | | | | | | |
| Example | homo-polymer (wt %) | Amount (wt %) | Ethylene unit (mol %) | Other monomer (mol %) | Melting point (° C.) | MI | Lubricant* (wt %) | Measure-ing tem-perature (° C.) | Friction coef-ficient | Abrasion wear ($\mu$) |
| 15 | 96.99 | 3 | 85 | 1-butene (15) | 67 | 3.6 | A (0.01) | 60 | 0.17 | 63 |
| | | | | | | | | 80 | 0.17 | 61 |
| | | | | | | | | 100 | 0.17 | 61 |
| 16 | 94 | 3 | 85 | 1-hexene (15) | 66 | 3.6 | A (3.0) | 60 | 0.16 | 60 |
| | | | | | | | | 80 | 0.15 | 55 |
| | | | | | | | | 100 | 0.16 | 60 |

*see Table 1

TABLE 5

Comparative Example

| | Composition | | | | | | | Evaluation | | |
|---|---|---|---|---|---|---|---|---|---|---|
| | Polyoxy-methlene | Polyolefin | | | | | | | | |
| Example | homo-polymer (wt %) | Amount (wt %) | Ethylene unit (mol %) | Other monomer (mol %) | Melting point (° C.) | MI | Lubricant* (wt %) | Measure-ing tem-perature (° C.) | Friction coef-ficient | Abrasion wear ($\mu$) |
| 17 | 94 | 3 | 88.7 | 1-butene (12.3) | 83 | 3.6 | A (3.0) | 60 | 0.34 | 110 |
| | | | | | | | | 80 | 0.43 | 120 |
| | | | | | | | | 100 | 0.48 | 130 |
| 18 | 94 | 3 | 83 | 1-butene (17) | 30 | 3.6 | A (3.0) | 60 | 0.24 | 120 |
| | | | | | | | | 80 | 0.28 | 130 |
| | | | | | | | | 100 | 0.33 | 140 |
| 19 | 94 | 3 | 85 | 1-butene (15) | 67 | 3.6 | — | 60 | 0.24 | 100 |
| | | | | | | | | 80 | 0.28 | 102 |
| | | | | | | | | 100 | 0.33 | 105 |
| 20 | 96.995 | 3 | 85 | 1-butene (15) | 67 | 3.6 | A (0.005) | 60 | 0.24 | 94 |
| | | | | | | | | 80 | 0.28 | 96 |
| | | | | | | | | 100 | 0.33 | 99 |
| 21 | 86.0 | 3 | 85 | 1-butene (15) | 67 | 3.6 | A (11) | 60 | 0.24 | 95 |
| | | | | | | | | 80 | 0.28 | 98 |
| | | | | | | | | 100 | 0.33 | 100 |

*see Table 1

TABLE 6

Comparative Example

| | Composition | | | | | | | Evaluation | | |
|---|---|---|---|---|---|---|---|---|---|---|
| | Polyoxy-methlene | Polyolefin | | | | | | | | |
| Example | homo-polymer (wt %) | Amount (wt %) | Ethylene unit (mol %) | Other monomer (mol %) | Melting point (° C.) | MI | Lubricant* (wt %) | Measure-ing tem-perature (° C.) | Friction coef-ficient | Abrasion wear ($\mu$) |
| 22 | 94 | 3 | 99.2 | 1-butene (0.8) | 130 | 3.6 | A (3.0) | 60 | 0.29 | 150 |
| | | | | | | | | 80 | 0.33 | 160 |
| | | | | | | | | 100 | 0.33 | 180 |

TABLE 6-continued

Comparative Example

| | Composition | | | | | | | Evaluation | | |
|---|---|---|---|---|---|---|---|---|---|---|
| | Polyoxy-methylene | Polyolefin | | | | | | Measure- | | |
| Example | homo-polymer (wt %) | Amount (wt %) | Ethylene unit (mol %) | Other monomer (mol %) | Melting point (° C.) | MI | Lubricant* (wt %) | ing tem-perature (° C.) | Friction coef-ficient | Abrasion wear ($\mu$) |
| 23 | 94 | 3 | 100 | — | 110 | 3.6 | A (3.0) | 60 | 0.33 | 180 |
| | | | | | | | | 80 | 0.43 | 180 |
| | | | | | | | | 100 | 0.48 | 180 |
| 24 | 94 | 3 | 92.4 | 1-octene (7.6) | 67 | 3.6 | A (3.0) | 60 | 0.28 | 110 |
| | | | | | | | | 80 | 0.33 | 100 |
| | | | | | | | | 100 | 0.38 | 100 |
| 25 | 94 | 3 | 85 | 1-butene (15) | 67 | 3.6 | G (3.0) | 60 | 0.33 | 120 |
| | | | | | | | | 80 | 0.28 | 135 |
| | | | | | | | | 100 | 0.33 | 135 |
| 26 | 94 | 3 | 85 | 1-butene (15) | 67 | 3.6 | H (3.0) | 60 | 0.34 | 110 |
| | | | | | | | | 80 | 0.30 | 120 |
| | | | | | | | | 100 | 0.38 | 120 |

*see Table 1

Industrial Applicability

The resin composition of the present invention can be used for various sliding parts of office automation equipments and automobiles (for example, gears, bearings, levers, key stems, cams, ratchets, and rollers), guide rollers of VTR, side plates, cam gears, gears of copying machine, paper-feeding driving parts of LBP, toner-agitating gear trains, gears of cartridge, CD-ROM sliding parts, etc. Especially, the composition can be suitably used for gears, cams, pulleys and levers which are fitted to CD-ROM chassis, cartridge gear box of printers, etc., facsimile chassis, floppy disk chassis, etc. which are in contact with noncrystalline resins at environmental temperatures of 60° C. or more.

What is claimed is:

1. A polyoxymethylene resin which comprises:
   (A) 70–99.89% by weight of a polyoxymethylene resin,
   (B) 0.1–20% by weight of at least one ethylene-substituted vinyl copolymer having a melting point of 40–80° C. which is prepared by the polymerization using a chromium-containing catalyst or a Ziegler catalyst, and
   (C) 0.01–10% by weight of at least one liquid ethylene-$\alpha$-olefin random copolymer, wherein the ethylene-substituted vinyl copolymer is an ethylene-$\alpha$-olefin copolymer.

2. A polyoxymethylene resin composition according to claim 1, wherein the chromium-containing catalyst is a catalyst containing chromium trioxide and silicon dioxide.

3. A polyoxymethylene resin composition according to claim 1, wherein the polyoxymethylene resin comprises oxymethylene copolymers having a branched molecular chain, and 50% by weight or more of a segment comprising oxymethylene unit.

4. A polyoxymethylene resin composition according to claim 1, wherein the polyoxymethylene resin comprises oxymethylene copolymers containing 0.1–20% by weight of an oxyalkylene unit having 2–8 carbon atoms.

5. A polyoxymethylene resin composition according to claim 4, wherein the oxymethylene copolymers are obtained by the copolymerization of trioxane or tetraoxan with a cyclic ether.

6. A polyoxymethylene resin composition according to claim 5, wherein the cyclic ether is ethylene oxide, propylene oxide, 1,3-dioxolan, formal of glycol or formal of diglycol.

7. A polyoxymethylene resin composition according to claim 1, wherein the ethylene-substituted vinyl copolymer is prepared from ethylene and a $C_{3-20}$-$\alpha$-olefin.

8. A polyoxymethylene resin composition according to claim 7, wherein the $C_{3-20}$-$\alpha$-olefin is propylene, 1-butene, 1-pentene, 4-methyl-1-pentene, 1-hexene, 1-heptene, and 1-octene.

9. A polyoxymethylene resin composition according to claim 7, wherein the ethylene-substituted vinyl copolymer is prepared from a $C_{3-8}$-$\alpha$-olefin.

10. A polyoxymethylene resin composition according to claim 1, wherein the ethylene-substituted vinyl copolymer has a melt index 0.1–40 g/10 min as measured by ASTM D 1238-57 E.

11. A polyoxymethylene resin composition according to claim 10, wherein the ethylene-substituted vinyl copolymer has a melt index 0.5–10 g/10 min as measured by ASTM D1238-57 E.

12. A polyoxymethylene resin composition according to claim 1, wherein the ethylene-substituted vinyl copolymer is 1–3% by weight of the total weight of the polyoxymethylene resin.

13. A polyoxymethylene resin composition according to claim 1, wherein the liquid ethylene-a-olefin random copolymer is prepared from ethylene with at least one of propylene, 1 -butene, 1 -pentene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene or 1-eicosene.

14. A polyoxymethylene resin composition which comprises:
   (A) 70–99.89% by weight of a polyoxymethylene resin,
   (B) 0.1–20% by weight of at least one ethylene-substituted vinyl copolymer having a melting point of 40–80° C. which is prepared by the polymerization using a Ziegler catalyst, and
   (C) 0.01–10% by weight of at least one liquid ethylene-$\alpha$-olefin random copolymer, wherein the ethylene-substituted vinyl copolymer is an ethylene-$\alpha$-olefin copolymer.

15. A polyoxymethylene resin composition according to claim 14, wherein the Ziegler catalyst is a catalyst containing a compound of titanium and/or vanadium and an organoaluminum compound as constituting components.

16. A polyoxymethylene resin composition according to claim 14, wherein the ethylene-substituted vinyl copolymer is a resin prepared by a process which comprises copolymerizing ethylene with 1-butene in the presence of a catalyst comprising a reaction product of a vanadyl halide with cyclohexane and an organoaluminum halide in an inert solvent which makes it possible to carry out a slurry polymerization.

17. A polyoxymethylene resin composition which comprises:
   (A) 70–99.89% by weight of a polyoxymethylene resin,
   (B) 0.1–20% by weight of at least one ethylene-substituted vinyl copolymer having a melting point of 40–80° C. which is prepared by the polymerization using a radical polymerization catalyst, a chromium-containing catalyst or a Zieger catalyst, and
   (C) 0.01–10% by weight of at least one liquid ethylene-α-olefin random copolymer;
   wherein the ethylene-substituted vinyl copolymer is an ethylene-1-butene copolymer.

18. A polyoxymethylene resin composition according to claim 17, wherein the ethylene-substituted vinyl copolymer is an ethylene-1-butene copolymer having a melting point of 60–75° C.

19. A polyoxymethylene resin composition according to claim 14 or 17, wherein the polyoxymethylene resin is a polyoxymethylene homopolymer whose both the terminals are blocked with acetyl groups.

20. A polyoxymethylene resin composition according to claim 14 or 17, wherein the polyoxymethylene resin is a polyoxymethylene block copolymer whose one terminal is blocked with a residue of an adduct of an alcohol with an alkylene oxide.

21. A polyoxymethylene resin composition according to claim 20, wherein the alcohol is a $C_{12-22}$ aliphatic alcohol.

22. A polyoxymethylene resin composition according to claim 20, wherein the alkylene oxide is propylene oxide or tetramethylene oxide.

23. A polyoxymethylene resin composition according to claim 20, wherein the alkylene oxide is added to the alcohol in a mol number of 1–1,000.

24. A polyoxymethylene resin composition according to claim 23, wherein the mol number is 1–50.

25. A polyoxymethylene resin composition according to claim 20, wherein the block copolymer has a number-average molecular weight of 10,000–500,000, wherein the number-average molecular weight value does not include the terminal group.

26. A polyoxymethylene resin composition according to claim 14 or 17, wherein the polyoxymethylene resin is a blend of a polyoxymethylene homopolymer whose both the terminals are blocked with acetyl groups and a polyoxymethylene block copolymer whose one terminal is blocked with a residue of an adduct of an alcohol with an alkylene oxide.

27. A polyoxymethylene resin composition according to claim 26, wherein the polyoxymethylene block copolymer is 5–90% by weight of the total weight of the polyoxymethylene resin.

28. A polyoxymethylene resin composition according to claim 27, wherein the polyoxymethylene block copolymer is 50–80% by weight of the total weight of the polyoxymethylene resin.

29. A polyoxymethylene resin composition according to claim 14 or 17, wherein the liquid ethylene-α-olefin random copolymer has a number-average molecular weight of 500–10,000, an ethylene unit content of 20–80 molt and 3–20 carbon atoms in the α-olefin.

30. A polyoxymethylene resin composition according to claim 29, wherein the number of carbon atoms in the α-olefin unit in the liquid ethylene-α-olefin random copolymer is 3.

31. A polyoxymethylene resin composition according to claim 14 or 17 which additionally contains a β-alanine copolymer in an amount of 0.01–5 parts by weight based on 100 parts by weight of the composition comprising the components (A), (B) and (C).

32. A polyoxymethylene resin composition according to claim 14 or 17 which contains boron nitride having an average particle diameter of 0.5–10 μm and a diboron trixoide content of 0.01–1.0% by weight based on the total boron nitride, the amount of the boron nitride being 5–500 ppm based on 100 parts by weight of the composition comprising the components (A), (B) and (C).

* * * * *